US012614986B2

(12) United States Patent
Huang et al.

(10) Patent No.: US 12,614,986 B2
(45) Date of Patent: Apr. 28, 2026

(54) RESONANT CONVERTER AND RESONANT CONVERSION CIRCUITRY

(71) Applicant: DELTA ELECTRONICS, INC., Taoyuan City (TW)

(72) Inventors: Chao-Jui Huang, Taoyuan City (TW); Wei-Shan Yeh, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 314 days.

(21) Appl. No.: 18/448,159

(22) Filed: Aug. 10, 2023

(65) Prior Publication Data

US 2024/0275290 A1     Aug. 15, 2024

(30) Foreign Application Priority Data

Feb. 10, 2023    (CN) .......................... 202310107246.8

(51) Int. Cl.
| | |
|---|---|
| *H02M 3/335* | (2006.01) |
| *H02M 3/00* | (2006.01) |
| *H02M 7/797* | (2006.01) |

(52) U.S. Cl.
CPC ......... *H02M 3/33573* (2021.05); *H02M 3/01* (2021.05); *H02M 3/33584* (2013.01); *H02M 7/797* (2013.01)

(58) Field of Classification Search
CPC .... H02M 1/0043; H02M 1/0067; H02M 3/01; H02M 3/335; H02M 3/33573; H02M 3/33584; H02M 7/797
See application file for complete search history.

(56) References Cited

U.S. PATENT DOCUMENTS

| | | | |
|---|---|---|---|
| 11,159,089 B2 | 10/2021 | Zhang et al. | |
| 2015/0180350 A1* | 6/2015 | Huang .............. | H02M 3/33584 |
| | | | 307/66 |

(Continued)

FOREIGN PATENT DOCUMENTS

| | | |
|---|---|---|
| CN | 103560674 A | 2/2014 |
| CN | 111193398 A | 5/2020 |

(Continued)

OTHER PUBLICATIONS

Zhang Wenping et al: "Survey on Fault-Tolerant Techniques for Power Electronic Converters", IEEE Transactions on Power Electronics, Institute of Electrical and Electronics Engineers, USA, vol. 29, No. 12, Dec. 1, 2014, pp. 6319-6331.

(Continued)

*Primary Examiner* — Gary L Laxton
(74) *Attorney, Agent, or Firm* — CKC & Partners Co., LLC

(57)     ABSTRACT

A resonant converter includes a first conversion circuit, a resonant transformer circuit, a second conversion circuit and a switching circuit. The resonant transformer circuit is coupled to multiple first bridge arm units of the first conversion circuit, and is configured to convert a first voltage into a second voltage. The second conversion circuit includes multiple second bridge arm units and multiple multi-level switching elements. The switching circuit is coupled to the second conversion circuit to selectively change connection positions of the second bridge arm units, so that the second conversion circuit converts the second voltage into a first DC (direct current) power by the second bridge arm units instead of by the multi-level switching elements, or the second conversion circuit converts the second voltage into a second DC (direct current) power by (Continued)

the second bridge arm units and multi-level switching elements.

18 Claims, 6 Drawing Sheets

(56)                     References Cited

U.S. PATENT DOCUMENTS

| | | | | |
|---|---|---|---|---|
| 2016/0352251 | A1 | 12/2016 | Li et al. | |
| 2019/0229632 | A1* | 7/2019 | Ishibashi | H02M 3/33576 |
| 2020/0044571 | A1* | 2/2020 | Bouchez | H02M 3/33584 |
| 2020/0052608 | A1 | 2/2020 | Bala et al. | |
| 2021/0045208 | A1* | 2/2021 | Biery | H05B 45/22 |
| 2021/0296999 | A1* | 9/2021 | Taleb | B60L 53/20 |
| 2021/0408927 | A1* | 12/2021 | Zhang | H02M 3/33592 |
| 2022/0166325 | A1 | 5/2022 | Wang | |
| 2024/0186908 | A1* | 6/2024 | Pan | H02M 3/01 |

FOREIGN PATENT DOCUMENTS

| | | | |
|---|---|---|---|
| CN | 112202344 | B | 5/2021 |
| CN | 112104214 | B | 9/2021 |
| CN | 113541493 | A | 10/2021 |
| CN | 113809931 | A | 12/2021 |
| CN | 216390810 | U | 4/2022 |
| EP | 3675340 | A1 | 7/2020 |
| EP | 3787170 | A1 | 3/2021 |
| JP | 2011-142740 | A | 7/2011 |
| JP | 2014128131 | A | 7/2014 |
| JP | 2021027768 | A | 2/2021 |
| JP | 2021-35328 | A | 3/2021 |
| JP | 2021097465 | A | 6/2021 |
| JP | 2021-191228 | A | 12/2021 |
| KR | 20100050159 | A | 5/2010 |
| TW | 201537875 | A | 10/2015 |
| TW | I685169 | B | 2/2020 |
| TW | 202021248 | A | 6/2020 |
| WO | 2019/128661 | A1 | 7/2019 |

OTHER PUBLICATIONS

Xing Xiangyang et al: "An Adaptive Model Predictive Control for Reduced Switch Count Three-Level Inverter", IEEE Journal of Emerging and Selected Topics in Power Electronics, IEEE, Piscataway, NJ, USA, vol. 11, No. 1, Aug. 12, 2022, pp. 453-464.

* cited by examiner

RESONANT CONVERTER AND RESONANT CONVERSION CIRCUITRY

CROSS-REFERENCE TO RELATED APPLICATION

This application claims priority to China Application Serial Number 202310107246.8, filed Feb. 10, 2023, which is herein incorporated by reference in its entirety.

BACKGROUND

Technical Field

The present disclosure relates to a technology for converting power, especially a resonant converter and a resonant conversion circuitry.

Description of Related Art

In recent years, with the popularity of environmental protection concepts, electric vehicle using electric energy as a power source have become more and more popular. Correspondingly, the importance and application requirements of power conversion circuits are increasing day by day. Therefore, how to improve the current power conversion circuit is one of the important subjects in this field.

SUMMARY

One aspect of the present disclosure is a resonant converter comprising a first conversion circuit, a resonant transformer circuit, a second conversion circuit and a switching circuit. The first conversion circuit comprises a plurality of first bridge arm units, and is configured to output a first voltage. The resonant transformer circuit is coupled to the plurality of first bridge arm units, and is configured to convert the first voltage into a second voltage. The second conversion circuit is coupled to the resonant transformer circuit, and comprises a plurality of second bridge arm units and a plurality of multi-level switching elements. The switching circuit is coupled to the second conversion circuit to selectively change a plurality of connection positions of the plurality of second bridge arm units, so that the second conversion circuit converts the second voltage into a first direct current power by the plurality of second bridge arm units instead of by the plurality of multi-level switching elements, or the second conversion circuit converts the second voltage into a second direct current power by the plurality of second bridge arm units and the plurality of multi-level switching elements.

Another aspect of the present disclosure is a resonant conversion circuitry comprising a first resonant converter and a second resonant converter. The first resonant converter comprises a first front-stage conversion circuit and a first resonant transformer circuit. The first front-stage conversion circuit is configured to generate a first voltage according to a plurality of first front-stage control signal. The first resonant transformer circuit is coupled to the first front-stage conversion circuit, and is configured to convert the first voltage into a second voltage. The second resonant converter comprises a second front-stage conversion circuit and a second resonant transformer circuit. The second front-stage conversion circuit is configured to generate a third voltage according to a plurality of second front-stage control signal. The second resonant transformer circuit is coupled to the second front-stage conversion circuit, and is configured to convert the third voltage into a fourth voltage. The second resonant transformer circuit is further coupled to the first resonant transformer circuit. The plurality of first front-stage control signals and the plurality of second front-stage control signals are interleaved with each other.

Another aspect of the present disclosure is a resonant conversion circuitry comprising a first resonant converter and a second resonant converter. The first resonant converter comprises a first front-stage conversion circuit, a first resonant transformer circuit and a first back-stage conversion circuit. The first front-stage conversion circuit comprises a plurality of first front-stage bridge arm units, and is configured to output a first voltage. The first resonant transformer circuit is coupled to the plurality of first front-stage bridge arm units, and is configured to convert the first voltage into a second voltage. The first back-stage conversion circuit is coupled to the first resonant transformer circuit, and comprises a plurality of first back-stage bridge arm units. The second resonant converter comprises a second front-stage conversion circuit, a second resonant transformer circuit and a second back-stage conversion circuit. The second front-stage conversion circuit comprises a plurality of second front-stage bridge arm units, and is configured to output a third voltage. The second resonant transformer circuit coupled to the plurality of second front-stage bridge arm units, and is configured to convert the third voltage into a fourth voltage. The second back-stage conversion circuit is coupled to the second resonant transformer circuit, and comprises a plurality of second back-stage bridge arm units. The state selection circuit is coupled to the first resonant converter and the second resonant converter, and is configured to selectively connect the first resonant converter and the second resonant converter in series, or connect the first resonant converter and the second resonant converter in parallel.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

With the increasing popularity of electric vehicles, the capacity and performance of energy storage units (e.g., detachable batteries) configured in electric vehicles are also increasing. When the energy storage units of the electric vehicle are not installed in the electric vehicle, these idle energy storage units can be used in other ways, for example, using as a power supply unit to provide household electricity. Similarly, a charging station (used to charge the electric vehicle, also known as electric vehicle supply equipment, EVSE) can also be applied to supply power to various electronic devices.

The energy storage unit of the electric vehicle or the charging station is equipped with a power converter with bidirectional charging and discharging functions. According to the development trend of the power system, the application requirements of the power converter are high power and high output voltage. Therefore, the semiconductor switches in the power converter need to have higher voltage stress (withstand voltage), but this will increase the cost.

Figure 1:
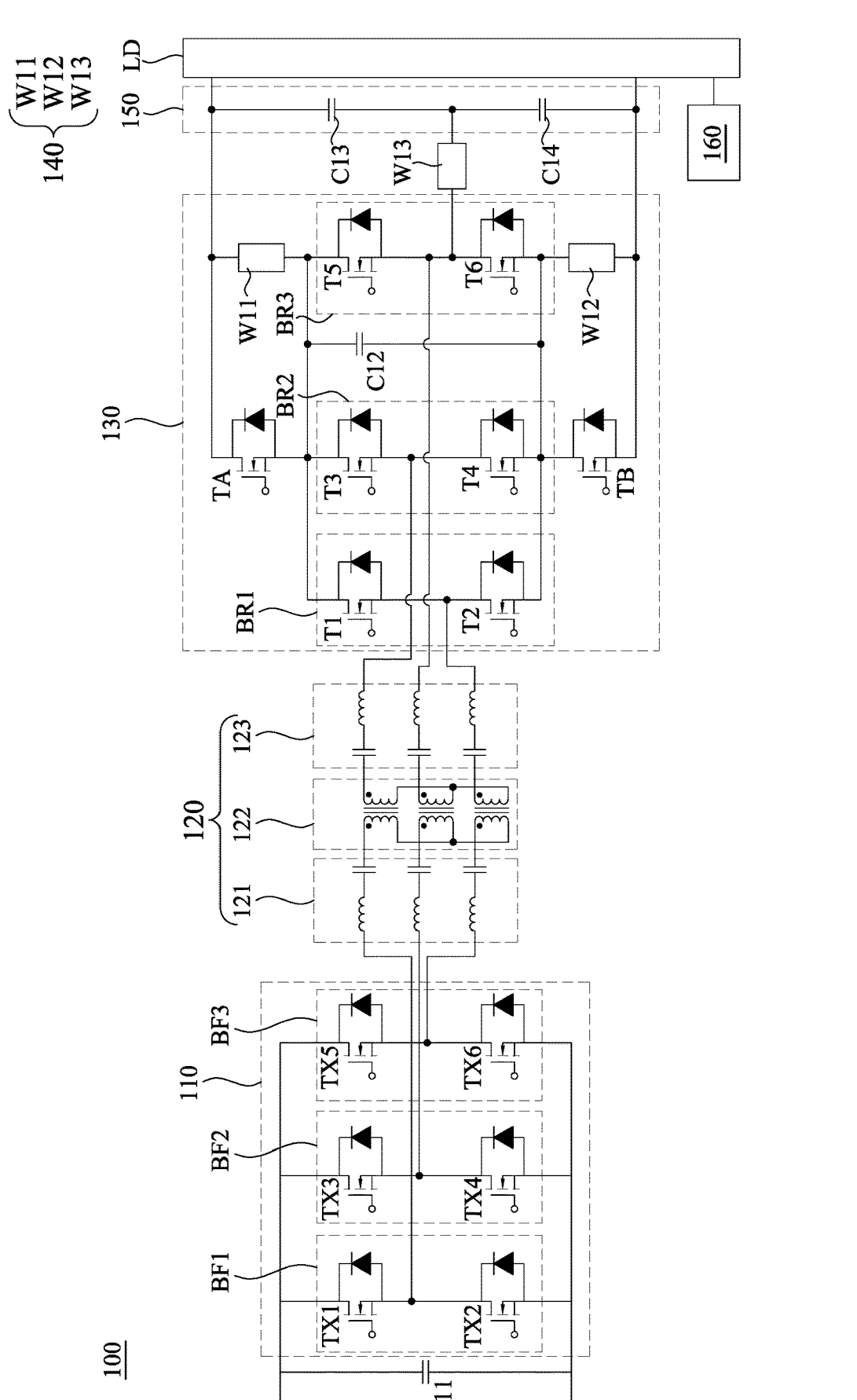
FIG. 1 is a schematic diagram of a resonant converter in some embodiments of the present disclosure.

FIG. 1 is a schematic diagram of a resonant converter 100 in some embodiments of the present disclosure. The resonant converter 100 includes a first conversion circuit 110, a resonant transformer circuit 120, a second conversion circuit 130 and a switching circuit 140. In one embodiment, the resonant converter 100 can be applied to an energy storage units or a charging station of an electric vehicle, but the present disclosure is not limited to this. The present disclosure can also be applied to power converters for any purpose.

The first conversion circuit 110 includes multiple first bridge arm units BF1, BF2, BF3. Each of the first bridge arm units BF1, BF2, BF3 respectively includes at least two transistor switches (TX1-TX6 as shown in FIG. 1), and a output node is respectively arranged between the two transistor switches of the same one of the first bridge arm units BF1-BF3 (e.g., TX1-TX2, TX3-TX4, TX5-TX6). In some embodiments, the first conversion circuit 110 receives an input voltage by a power factor correction (not shown in the figure) and an input capacitor C11.

In some embodiments, the resonant converter 100 further includes a processor 160. The processor 160 is configured to provide multiple control signals for the transistor switches TX1-TX6 in the first bridge arm units BF1, BF2, BF3, respectively, so that the transistor switches TX1-TX6 are turned on or off according to the corresponding control signal, and then output a first voltage through the output node.

As shown in FIG. 1, the first conversion circuit 110 receives an input voltage of direct current (DC) through the input capacitor C11 of the resonant converter 100, and then converts the input voltage into the first voltage of alternating current (AC) by the bridge arm units BF1, BF2, BF3. In some embodiments, the first conversion circuit 110 can be a full bridge conversion circuit. Since those skilled in the art understand the operation of the full bridge circuit, details will not be described here.

The resonant transformer circuit 120 includes a first resonant tank 121, a three-phase transformer 122 and a second resonant tank 123. The first resonant tank 121 has a resonant circuit formed by multiple sets of capacitors and inductors connected in series. The multiple sets of capacitors and inductors connected in series are respectively coupled to three output nodes of the first conversion circuit 110, and are configured to resonate the received first voltage. The three-phase transformer 122 is coupled to the first resonant tank 121, and is configured to convert the first voltage into the second voltage (e.g., increase or decrease voltage). The second resonant tank 123 is coupled to the three-phase transformer 122, and includes a resonant circuit with multiple sets of capacitors and inductors connected in series, so that the received second voltage resonates.

The second conversion circuit 130 is coupled to the resonant transformer circuit 120, and includes multiple second bridge arm units BR1-BR3, multiple multi-level switching elements TA-TB and a conversion capacitor C12. The second bridge arm units BR1-BR3 includes multiple bridge switches T1-T6. In some embodiments, the processor 160 is configured to respectively provide multiple control signals for the bridge switches T1-T6 in the second bridge arm units BR1, BR2, BR3 and the multi-level switching elements TA, TB, so that the bridge switches T1-T6 and the multi-level switching elements TA, TB are turned on or off according to the corresponding control signal.

The switching circuit 140 is coupled to the second conversion circuit 130, and is configured to selectively change multiple connection positions of the second bridge arm units BR1-BR3 (e.g., by turning multiple switches on or off.) As shown in FIG. 1, the switching circuit 140 is configured to couple to two terminals of the second bridge arm units BR1-BR3 to the multi-level switching elements TA-TB, or is configured to form a short-circuit path between two terminals of the second bridge arm units BR1-BR3 and output terminal of the resonant converter 100. Accordingly, the second conversion circuit 130 can be switched to different circuit structures for operation.

As mentioned above, when the switching circuit 140 is configured to form the short-circuit path between two terminals of the second bridge arm units BR1-BR3 and output terminal of the resonant converter 100, the second conversion circuit 130 converts the second voltage into a first direct current (DC) power by the second bridge arm units BR1-BR3 instead of by the multi-level switching elements TA-TB. In other words, the multi-level switching elements TA-TB will not work with the second bridge arm units BR1-BR3.

On the other hand, when the switching circuit 140 is configured to couple to two terminals of the second bridge arm units BR1-BR3 to the multi-level switching elements TA-TB, the second conversion circuit 130 converts the second voltage into a second direct current (DC) power, which is greater than the first direct current power, by the second bridge arm units BR1-BR3 and the multi-level switching elements TA-TB.

In one embodiment, the resonant converter 100 further includes a voltage divider circuit 150. The voltage divider circuit 150 is coupled to the second conversion circuit 130, and includes multiple divider capacitors C13-C14, and is configured to provide the first direct current power or the second direct current power generated by the second conversion circuit 130 to a load LD. In addition, the conversion capacitor C12 can be a flying capacitor to balance voltage of the divider capacitors C13 and C14.

Figure 2A:
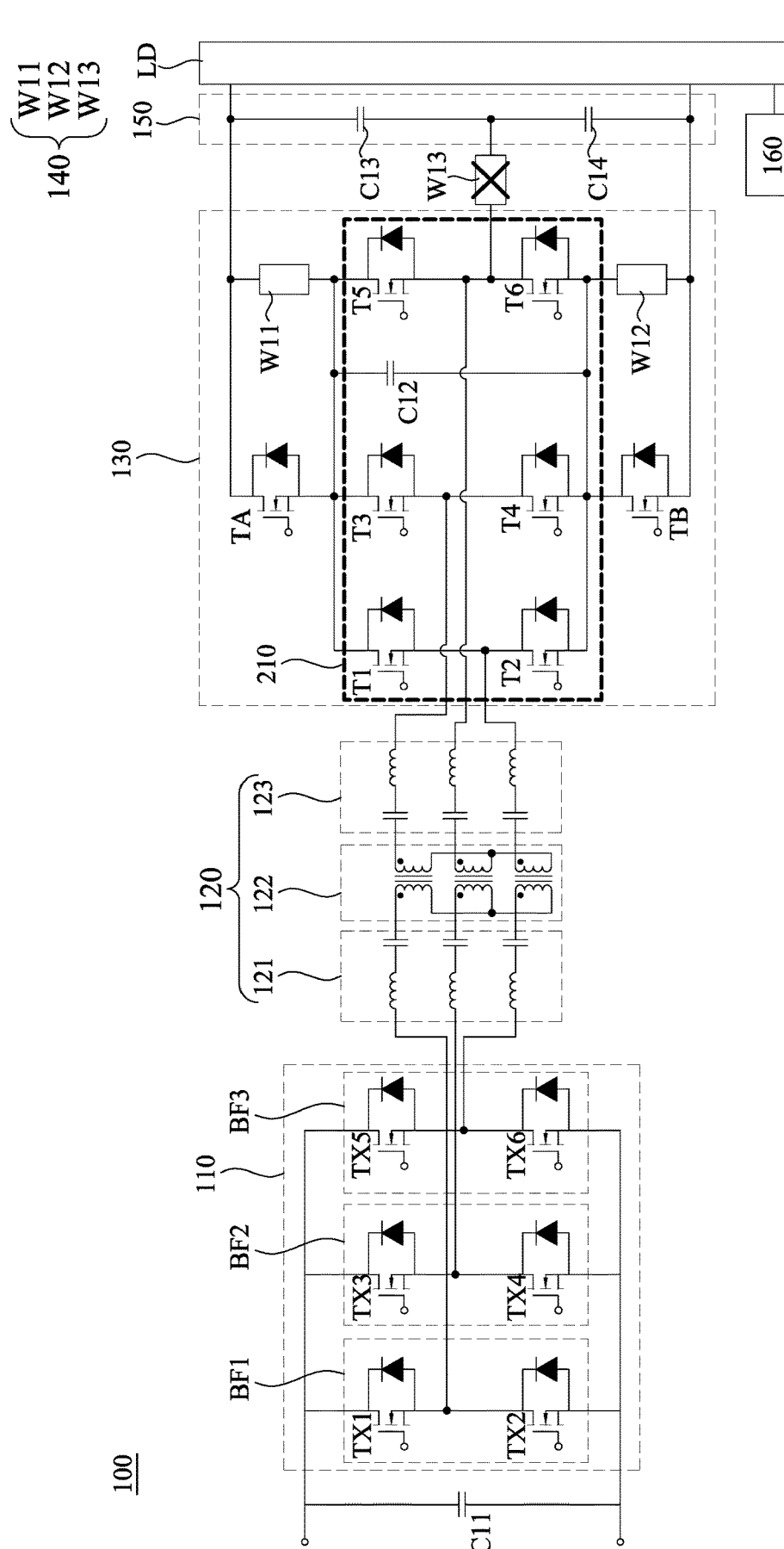
FIG. 2A is a schematic diagram of an operation of the resonant converter in some embodiments of the present disclosure.
Figure 2B:
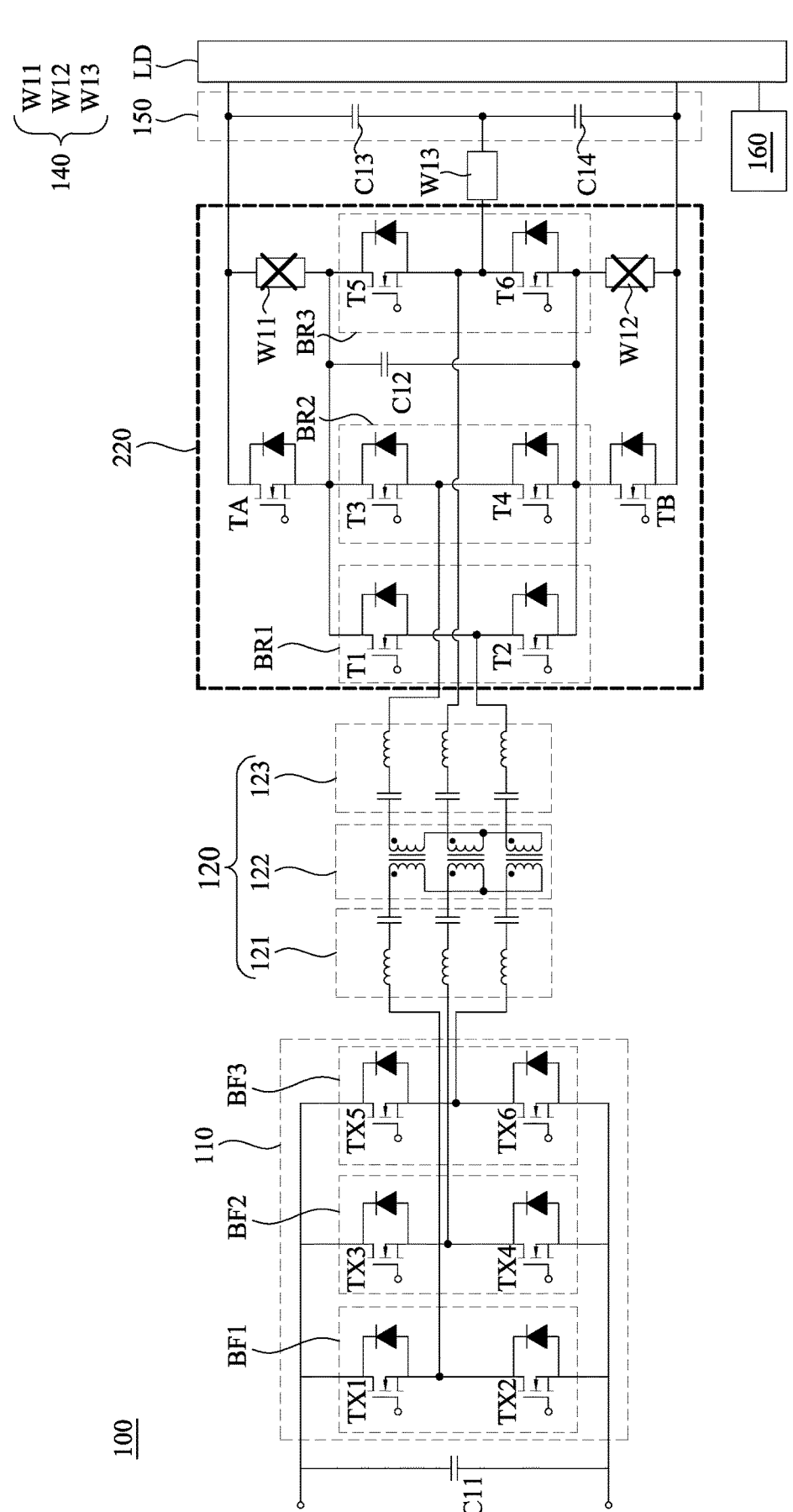
FIG. 2B is a schematic diagram of an operation of the resonant converter in some embodiments of the present disclosure.

FIG. 2A and FIG. 2B are schematic diagrams of operations of the resonant converter 100 in some embodiments of the present disclosure. In one embodiment, the switching circuit 140 includes multiple first short-circuit switches W11-W12. The first short-circuit switches W11-W12 are coupled to two terminals of the second bridge arm units BR1-BR3, and are coupled to two terminals of the voltage divider circuit 150. The first short-circuit switches W11-W12 are selectively turned on or off according to control signals provided by a processor 160. A terminal of the first short-circuit switches W11 is coupled to a positive output terminal of the resonant converter 100 (or coupled to a terminal of the voltage divider circuit 150.) The other terminal of the first short-circuit switches W11 is coupled to a terminal of the second bridge arm units BR1-BR3. A terminal of the first short-circuit switches W12 is coupled to the other terminal of the second bridge arm units BR1-BR3. The other terminal of the first short-circuit switches W12 is coupled to a negative output terminal of the resonant converter 100 (or coupled to the other terminal of the voltage divider circuit 150). When the first short-circuit switches W11-W12 are turned on, a short-circuit path will be formed (i.e., two terminals of the second bridge arm units BR1-BR3 are respectively coupled to the first short-circuit switches W11-W12), so voltage or current will not flow through the multi-level switching elements TA-TB.

As shown in FIG. 2A, in one embodiment, when the second bridge arm units BR1-BR3 is coupled to an output terminal of the resonant converter through the short-circuit path formed by the switching circuit 140 (the first short-circuit switches W11-W12 are turned on, but the second short-circuit switch W13 is turned off), the second bridge arm units BR1-BR3 are configured to be used as a full bridge circuit 210 to convert the second voltage into the first direct current power. At this time, cross-voltage withstand by each of the bridge switches T1-T6 in the second conversion circuit 130 will be equal to voltage output by the second conversion circuit 130 (the first direct current power.)

In one embodiment, the switching circuit 140 further includes a second short-circuit switch W13. The second short-circuit switch W13 is selectively turned on or off according to a control signal provided by the processor 160. One terminal of the second short-circuit switch W13 is coupled between bridge switches (e.g., the bridge switches T5-T6) of one of the second bridge arm units BR1-BR3. The other terminal of the second short-circuit switch W13 is coupled to a node between the divider capacitors C13 and C14.

As shown in FIG. 2B, in some embodiments, when two terminals of the second bridge arm units BR1-BR3 are coupled to the output terminal of the resonant converter through the plurality of multi-level switching elements TA-TB (i.e., the first short-circuit switches W11-W12 are turned off, but the second short-circuit switch W13 is turned on), the second bridge arm units BR1-BR3 and the plurality of multi-level switching elements TA-TB are used as a three-phase three-level circuit, so as to convert the second voltage into the second direct current power.

As shown in FIG. 2B, when the second conversion circuit 130 operates as a three-phase three-level circuit, the second direct current power output by the second conversion circuit 130 will be higher than the first direct current power (e.g., twice the first direct current power.) In addition, since two terminals of the second bridge arm units BR1-BR3 are coupled to the multi-level switching elements TA-TB for cooperative operation, and an intermediate node of at least one of the second bridge arm units (e.g., BR3) is coupled between the divider capacitors C13 and C14, when the second conversion circuit 130 converts the voltage, each of the bridge switches T1-T6 and the multi-level switching elements TA-TB will withstand a small cross-voltage (e.g., is half of a cross-voltage when the second conversion circuit 130 operates as a full bridge circuit.)

In the previous embodiments, the resonant converter 100 receives the input voltage by the first conversion circuit 110, and generates the output voltage by the second conversion circuit 130. In other embodiments, the resonant converter 100 can also receive the input voltage by the second conversion circuit 130, and generate the output voltage by the first conversion circuit 110. In other words, the resonant converter 100 can be a bidirectional resonant circuit, and its input and output terminals can be switched according to requirements.

The present disclosure selectively changes connection positions at two terminals of the second bridge arm units BR1-BR3 by the switching circuit 140, so that the second bridge arm units BR1-BR3 is coupled to the output terminal of the resonant converter 100 through the short-circuit path formed by the switching circuit 140, or two terminals of the second bridge arm units BR1-BR3 are coupled to the output terminal of the resonant converter through the multi-level switching elements TA-TB. Accordingly, it will be able to flexibly respond to different charging and discharging requirements. For example, when a load applied by the second conversion circuit 130 has a relatively large operating voltage, the switching circuit 140 can adjust the second conversion circuit 130 as a three-phase three-level circuit 220 to receive/output a larger voltage, so as to reduce the cross-voltage that each transistor element in the second conversion circuit 130 needs to withstand. On the other hand, when a load applied by the second conversion circuit 130 has a voltage of general amount, the switching circuit 140 can adjust the second conversion circuit 130 as a full bridge circuit 210 to receive/output a general voltage and save power consumption.

In general, the disadvantages of the three-phase three-level circuit are "requires a large number of power components" and "large volume", so it is difficult to design a high-density circuit. With the switching circuit 140, the present disclosure uses multiple multi-level switching elements TA, TB based on the architecture of the full bridge circuit. Accordingly, in addition to simplifying the circuit structure, the second conversion circuit 130 can have a different circuit structure to meet usage requirement, such as to achieve a wide voltage output range and a wide load range.

In the embodiment shown in FIG. 1, each switch (e.g., the transistor switches TX1-TX6 of the first bridge arm units BF1-BF3, the bridge switches T1-T6 of the second bridge arm units BR1-BR3, multi-level switching elements TA-TB, shorting switches W11-W13) is controlled by the processor 160. In other words, the processor 160 is coupled to the first conversion circuit 110, the second conversion circuit 130 and the switching circuit 140. Those skilled in the art should understand that an electrical isolation is formed between the first conversion circuit 110 and the second conversion circuit 130 by the resonant transformer circuit 120, so that part of the control signals provided by the processor 160 to the first conversion circuit 110, the second conversion circuit 130 and the switching circuit 140 need to be electrical isolated, but it will not be repeated here.

In addition, in one embodiment, the processor 160 can also be coupled to the load LD to detect an electrode voltage of the load LD. The electrode voltage of the load LD is used to reflect a power supply capability or charging requirements of the load LD. Therefore, the processor 160 can generate the detection signal by detecting the load LD, and controls the switching circuit 140 according to the detection signal to change connection positions at two terminals of the second bridge arm units BR1-BR3.

Figure 3:
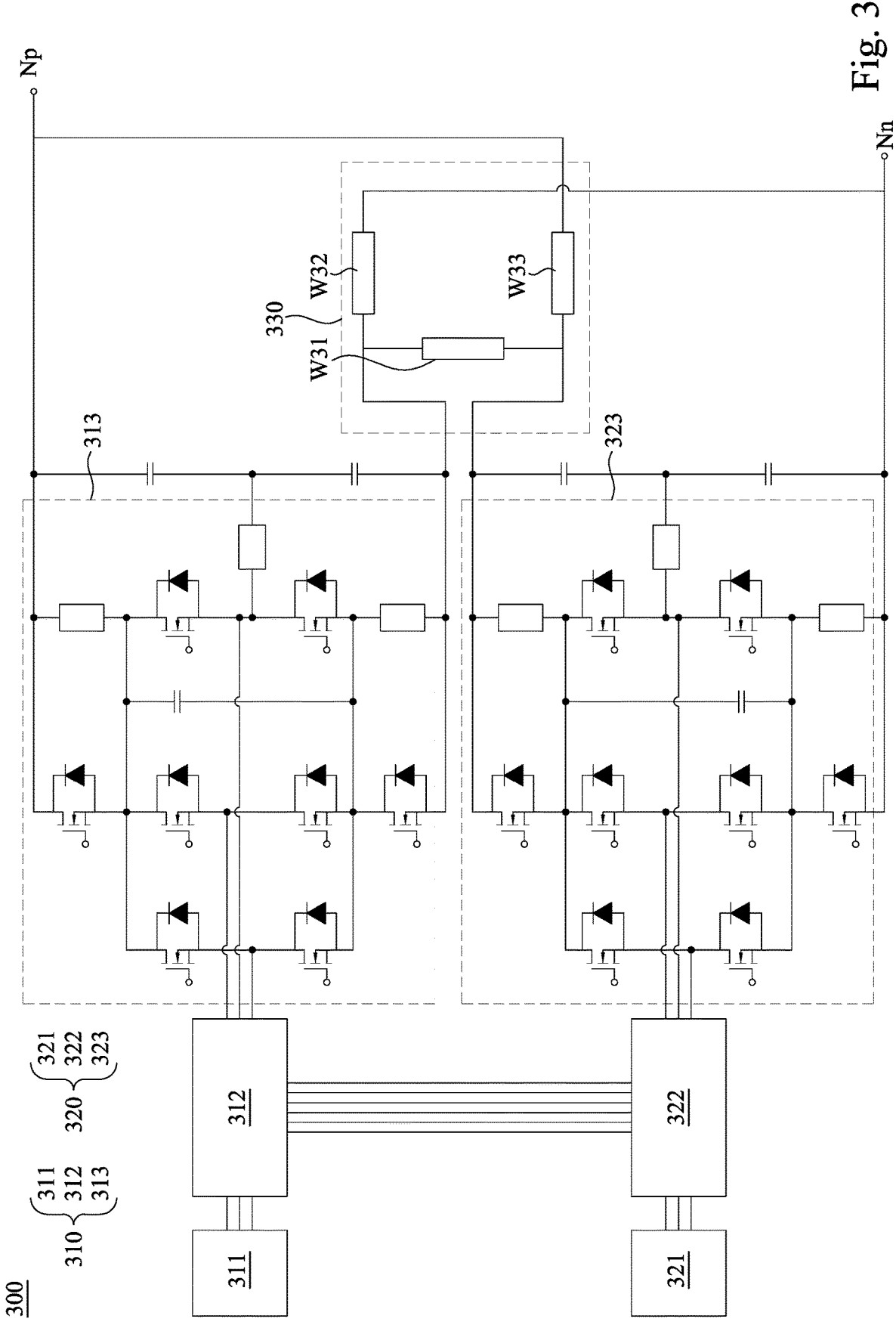
FIG. 3 is a schematic diagram of a resonant conversion circuitry in some embodiments of the present disclosure.

FIG. 3 is a schematic diagram of a resonant conversion circuitry 300 in some embodiments of the present disclosure. The resonant conversion circuitry 300 includes a first resonant converter 310 and a second resonant converter 320.

The first resonant converter 310 includes a first front-stage conversion circuit 311, a first resonant transformer circuit 312 and a first back-stage conversion circuit 313. In this embodiment, the structure of the first resonant converter 310 can be the same as the resonant converter 100 shown in FIG. 1. That is, the first front-stage conversion circuit 311 can be the first conversion circuit 110 as shown in FIG. 1, and includes multiple first front-stage bridge arm units, as first bridge arm units BF1-BF3 shown in FIG. 1. The first resonant transformer circuit 312 can be the resonant transformer circuit 120 shown in FIG. 1. The first back-stage conversion circuit 313 can be the second conversion circuit 130 shown in FIG. 1, and includes multiple first back-stage bridge arm units, as the second bridge arm units BR1-BR3 shown in FIG. 1.

Similarly, the structure of the second resonant converter 320 can be the same as the resonant converter 100 shown in FIG. 1. That is, the second front-stage conversion circuit 321 can be the first conversion circuit 110 shown in FIG. 1, and includes multiple second front-stage bridge arm units, as the first bridge arm units BF1-BF3 shown in FIG. 1. The second resonant transformer circuit 322 can be the resonant transformer circuit 120 shown in FIG. 1. The second back-stage conversion circuit 323 can be the second conversion circuit 130 shown in FIG. 1, and includes multiple second back-stage bridge arm units, as the second bridge arm units BR1-BR3 shown in FIG. 1.

In some embodiments, the resonant conversion circuitry 300 further includes a processor (not shown in FIG. 3), the processor is configured to provide control signals to respectively control multiple switching elements in the first resonant converter 310 and the second resonant converter 320. Specifically, the first front-stage conversion circuit 311 is configured to generate a first voltage according to multiple first front-stage control signals, then the first resonant transformer circuit 312 converts the first voltage into a second voltage. The second front-stage conversion circuit 321 is configured to generate a third voltage according to multiple second front-stage control signals, then the second resonant transformer circuit 322 converts the third voltage in to a fourth voltage.

In some embodiments, the first resonant transformer circuit 312 and the second resonant transformer circuit 322 are coupled to each other. For example, a first portion of multiple secondary windings in the first resonant transformer circuit 312 are coupled to each other, a first portion of multiple secondary windings in the second resonant transformer circuit 322 are coupled to each other, and a second portion of the secondary windings in the first resonant transformer circuit 312 are coupled to a second portion of multiple secondary windings in the second resonant transformer circuit 322.

As mentioned above, for the embodiment in which the first resonant transformer circuit 312 and the second resonant transformer circuit 322 are coupled to each other, the first front-stage control signal and the second front-stage control signal are interleaved with each other. That is, transistor switches (such as transistor switch TX1 shown in FIG. 1) corresponding to the same position in the first front-stage conversion circuit 311 and the second front-stage conversion circuit 321 are controlled in the opposite state (i.e., one is on, and the other is off).

Similarly, the first back-stage conversion circuit 313 converts the second voltage into a direct current power according to multiple first back-stage control signals. The second back-stage conversion circuit 323 converts the fourth voltage into a direct current power according to multiple second back-stage control signals. The first back-stage control signals and the second back-stage control signals are interleaved with each other, so that the first resonant converter 310 and the second resonant converter 320 can cooperate with each other.

Figure 4:
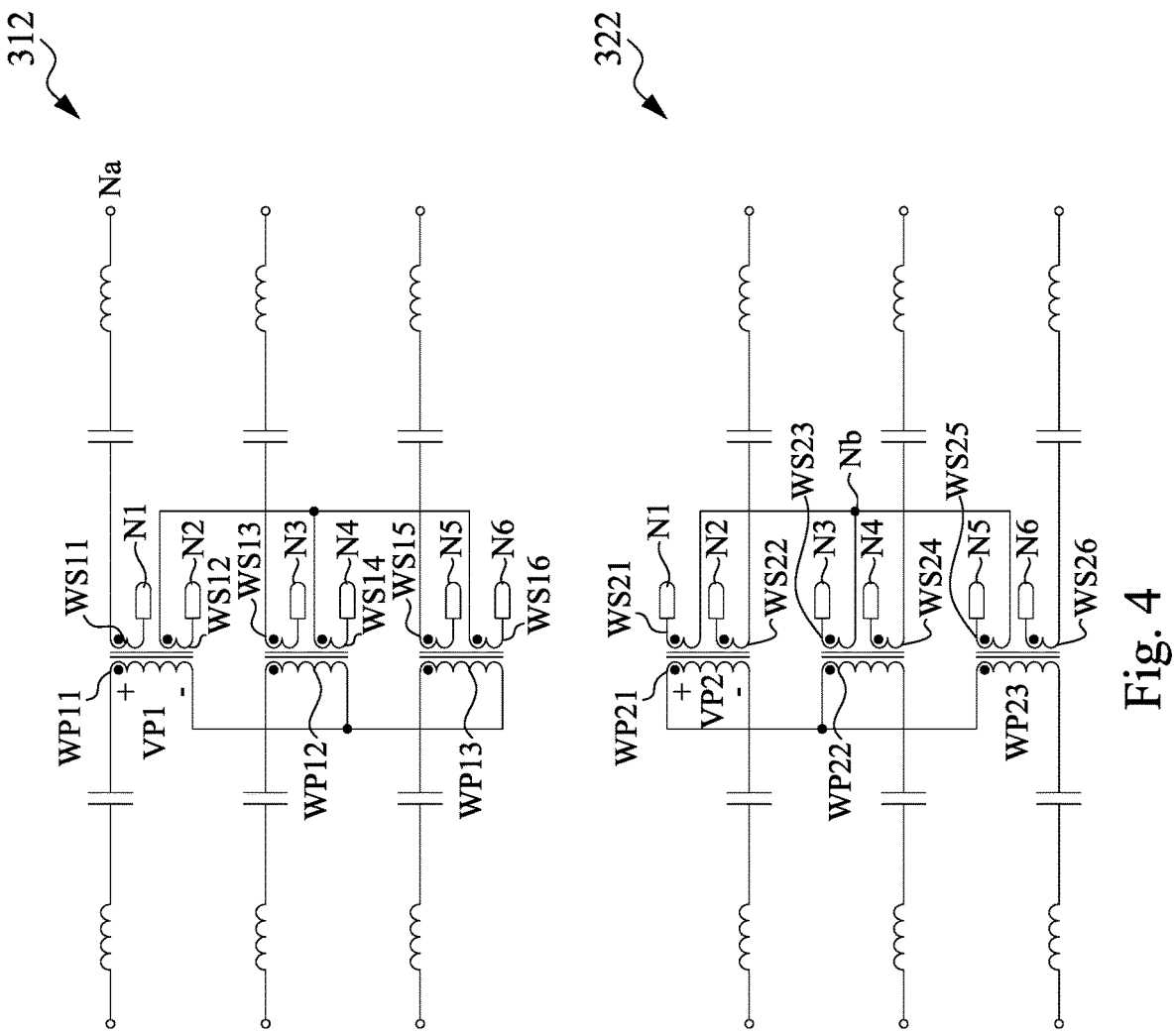
FIG. 4 is a partial schematic diagram of the resonant conversion circuitry in some embodiments of the present disclosure.

FIG. 4 is a partial schematic diagram of the first resonant transformer circuit 312 and the second resonant transformer circuit 322 in some embodiments of the present disclosure. The first resonant transformer circuit 312 includes multiple primary windings WP11, WP12, WP13 and multiple secondary windings, and each of secondary windings further includes first sub-windings (WS11, WS13, WS15 as shown in the figure) and second sub-windings (WS12, WS14, WS16 as shown in the figure.) Similarly, the second resonant transformer circuit 322 includes multiple primary windings WP21, WP22, WP23 and multiple secondary windings, and each of secondary windings further includes first sub-windings (WS21, WS23, WS25 as shown in the figure) and second sub-windings (WS22, WS24, WS26 as shown in the figure.)

A first portion of multiple secondary windings in the first resonant transformer circuit 312 are coupled to each other. A first portion of multiple secondary windings in the second resonant transformer circuit 322 are coupled to each other. A second portion of multiple secondary windings in the first resonant transformer circuit 312 and the second resonant transformer circuit 322 are coupled to each other. Accordingly, the voltages of the first resonant transformer circuit 312 and the second resonant transformer circuit 322 can be added because of the interleave, so that the output voltage of the first resonant transformer circuit 312 and the second resonant transformer circuit 322 will be higher.

As shown in FIG. 4, specifically, the same corresponding terminal (e.g., negative terminal, unmarked terminal) of the primary windings WP11-WP13 in the first resonant transformer circuit 312 are coupled to each other. Similarly, the same corresponding terminal (e.g., positive terminal, dotted terminal) of the primary windings WP21-WP23 in the second resonant transformer circuit 322 are coupled to each other.

In FIG. 4, positions marked with the same nodes N1-N6 represent that these nodes are coupled to each other. In some embodiments, first terminals (e.g., positive terminal) of the first sub-windings WS11/WS13/WS15 in the first resonant transformer circuit 312 are coupled to the first back-stage conversion circuit 313 by the resonant tank. Second terminals (e.g., negative terminal) of the first sub-windings WS11/WS13/WS15 in the first resonant transformer circuit 312 are respectively coupled to each one of the secondary windings in the second resonant transformer circuit 322, and coupling positions are interleaved (i.e., positive terminal coupled to negative terminal). For example, the first sub-winding WS11 is coupled to the first sub-winding WS21 through the node N1, a first sub-winding WS13 is coupled to the first sub-winding WS23 through the node N3, and a first sub-winding WS15 is coupled to the first sub-winding WS25 through the node N5.

In some embodiments, first terminals (e.g., positive terminal) of the second sub-windings WS12/WS14/WS16 in the first resonant transformer circuit 312 are coupled to each other. Second terminals (e.g., negative terminal) of the second sub-windings WS12/WS14/WS16 in the first resonant transformer circuit 312 are respectively coupled to another one of secondary windings in the second resonant transformer circuit 322, and coupling positions are interleaved (i.e., positive terminal coupled to negative terminal). For example, the second sub-windings WS12 is coupled to the second sub-windings WS22 through the node N2, a second sub-windings WS14 is coupled to the second sub-windings WS24 through the node N4, a second sub-windings WS16 is coupled to the second sub-windings WS26 through the node N6.

Figure 5:
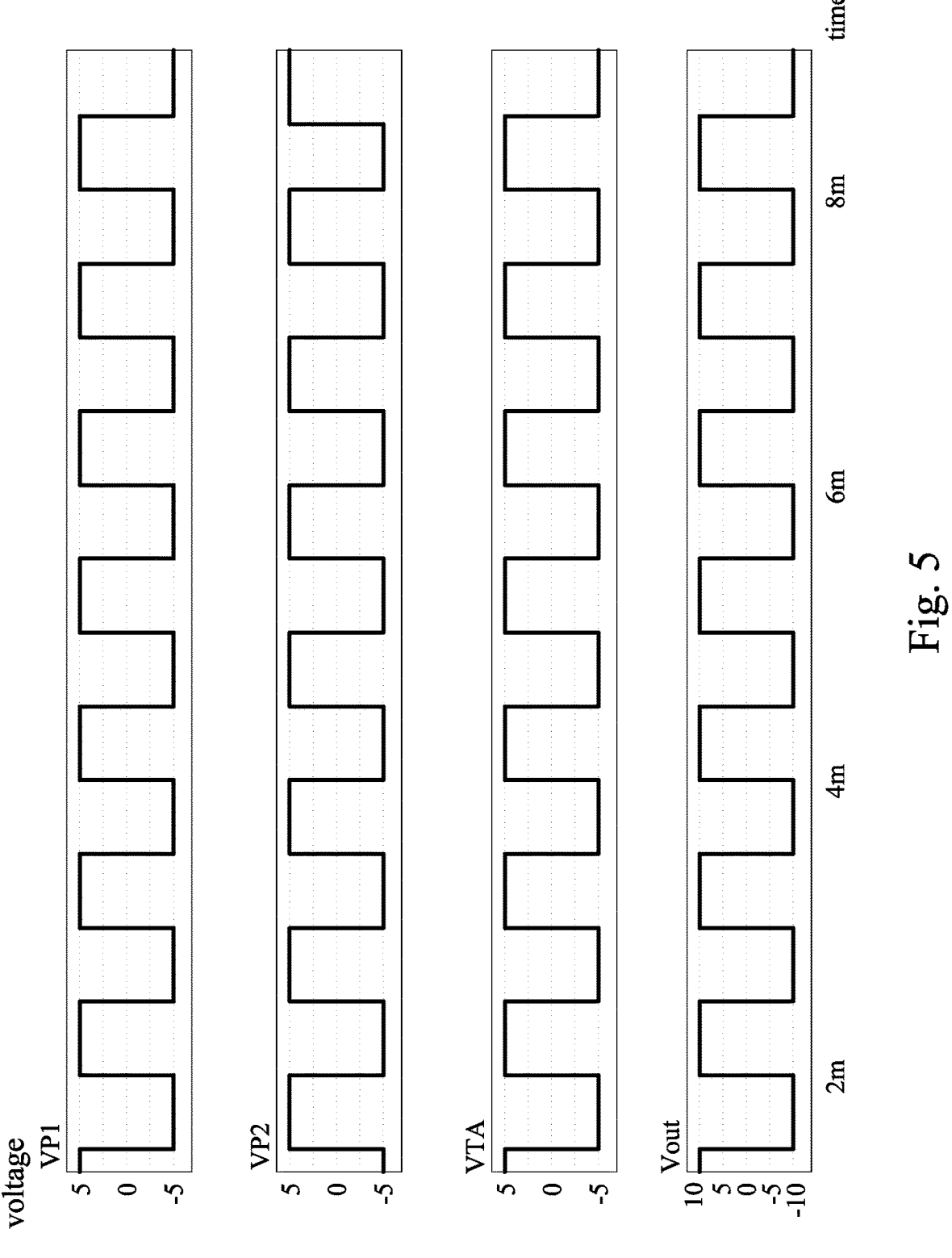
FIG. 5 is a voltage signal diagram of the resonant conversion circuitry in some embodiments of the present disclosure.

FIG. 5 is a voltage signal diagram of the resonant conversion circuitry in some embodiments of the present disclosure. FIG. 5 assumes that coil ratio of the primary winding to the secondary winding of the first resonant transformer circuit 312/the second resonant transformer circuit 322 is 1:1. The voltage signal diagram in FIG. 5 includes an induced voltage VP1 of the primary windings WP11, an induced voltage VP2 of the primary windings WP21, and an voltage VTA. The voltage VTA is induced voltage of the nodes N1 and N2. In addition, since the first resonant transformer circuit 312 and the second resonant transformer circuit 322 are interleaved with each other, an output voltage Vout of the secondary windings can be equal to a voltage difference between the nodes Na and Nb. Since the induced voltage VP1, VP2 are interleaved with each other, and the secondary windings of the first resonant transformer circuit 312 and the second resonant transformer circuit 322 are coupled to each other, the output voltage Vout will be "a sum of the induced voltage of the first resonant transformer circuit 312 and the second resonant transformer circuit 322 on node N1."

Referring to FIG. 3, in some embodiments, the resonant conversion circuitry 300 further includes a state selection circuit 330. The state selection circuit 330 is coupled to the first resonant converter 310 and the second resonant converter 320, and is configured to selectively connect the first resonant converter 310 and the second resonant converter 320 in series, or connect the first resonant converter 310 and the second resonant converter 320 in parallel (e.g., by turning multiple switches on or off).

In some embodiments, the state selection circuit 330 includes a series switch W31. The series switch W31 is coupled between the first resonant converter 310 and the second resonant converter 320. The first back-stage conversion circuit 313 is coupled to the positive output terminal Np of the resonant conversion circuitry 300 and a first terminal of the series switch W31. The second back-stage conversion circuit 323 is coupled to the negative output terminal Nn of the resonant conversion circuitry 300 and a second terminal of the series switch W31.

In some embodiments, the state selection circuit 330 includes a first parallel switch W32 and a second parallel switch W33. The first parallel switch W32 is coupled between the first terminal of the series switch W31 and the negative output terminal Nn. The second parallel switch W33 is coupled to the second terminal of the series switch W31 and the positive output terminal Np.

Accordingly, when the series switch W31 is turned on, and the parallel switches W32, W33 are turned off, the first resonant converter 310 and the second resonant converter 320 are connected in series (referred to as "series mode"). On the other hand, when the series switch W31 is turned off, and the parallel switches W32, W33 are turned on, the first resonant converter 310 and the second resonant converter 320 are connected in parallel (referred to as "parallel mode"). In the series mode, the resonant conversion circuit circuitry 300 provides a larger voltage. In the parallel mode, the resonant conversion circuitry 300 provides a larger current. Under the control of the state selection circuit 330, the resonant conversion circuitry 300 can charge and discharge in different modes according to application requirements and load conditions.

In the embodiment shown in FIG. 3, the first resonant converter 310 and/or the second resonant converter 320 may also have the switching circuit 140 as shown in FIG. 1. That is, the switching circuit of the first resonant converter 310 can be coupled to the first back-stage conversion circuit 313 to selectively change connection positions of the first back-stage bridge arm units. Accordingly, the first back-stage conversion circuit 313 converts the second voltage to the first direct current power by the first back-stage bridge arm units instead of the first multi-level switching elements (as the multi-level switching elements TA, TB shown in FIG. 1). Alternatively, the first back-stage conversion circuit 313 can convert the second voltage into the second direct current power by the first back-stage bridge arm units and the first multi-level switching elements.

In the previous embodiments, the resonant conversion circuitry 300 receives input voltage through the first front-stage conversion circuit 311 and the second front-stage conversion circuit 321. In some other embodiments, the resonant converter 100 can receive input voltage through the first back-stage conversion circuit 313 and the second back-stage conversion circuit 323. In other words, the resonant conversion circuitry 300 is a bidirectional resonant circuit, and its input/output terminals can be reversed according to requirements.

In the aforementioned embodiments, the present disclosure uses the resonant converter 100 as a basis and cooperates with the switching circuit 140, or the present disclosure couples resonant transformer circuits of multiple resonant converters 310 and 320, or the present disclosure uses multiple resonant converters 310 and 320 to cooperate with the state selection circuit 330. The above three applications are combined with each other, but the features of each other can be applied independently of each other. For example, the resonant converter can include multiple transformer circuits of multiple resonant converters, but the state selection circuit is not configured. Similarly, multiple resonant converters can adjust the series mode or the parallel mode by the state selection circuit, but multiple resonant transformer circuits are not coupled to each other.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

11

What is claimed is:

1. A resonant converter, comprising:
a first conversion circuit comprising a plurality of first bridge arm units, and configured to output a first voltage;
a resonant transformer circuit coupled to the plurality of first bridge arm units, and configured to convert the first voltage into a second voltage;
a second conversion circuit coupled to the resonant transformer circuit, and comprising a plurality of second bridge arm units and a plurality of multi-level switching elements; and
a switching circuit coupled to the second conversion circuit to selectively change a plurality of connection positions of the plurality of second bridge arm units, so that the second conversion circuit converts the second voltage into a first direct current power by the plurality of second bridge arm units instead of by the plurality of multi-level switching elements, or the second conversion circuit converts the second voltage into a second direct current power by the plurality of second bridge arm units and the plurality of multi-level switching elements.

2. The resonant converter of claim 1, wherein the switching circuit comprises a plurality of first short-circuit switches and a second short-circuit switch, the plurality of first short-circuit switches is coupled to two terminals of the plurality of second bridge arm units, the second short-circuit switch is coupled between a plurality of bridge switches of at least one of the plurality of second bridge arm units.

3. The resonant converter of claim 2, further comprising:
a voltage divider circuit coupled to the second conversion circuit, and comprising a plurality of divider capacitors; and
wherein the plurality of first short-circuit switches is coupled to two terminals of the voltage divider circuit, and the second short-circuit switch is coupled to the plurality of divider capacitors.

4. The resonant converter of claim 1, wherein the switching circuit is configured to selectively change the plurality of connection positions of the plurality of second bridge arm units, so that the plurality of second bridge arm units is coupled to an output terminal of the resonant converter through a short-circuit path formed by the switching circuit, or two terminals of the plurality of second bridge arm units are coupled to the output terminal of the resonant converter through the plurality of multi-level switching elements.

5. The resonant converter of claim 4, wherein when the two terminals of the plurality of second bridge arm units are coupled to the output terminal of the resonant converter through the plurality of multi-level switching elements, the plurality of second bridge arm units and the plurality of multi-level switching elements are used as a three-phase three-level circuit.

6. The resonant converter of claim 5, wherein when the plurality of second bridge arm units is coupled to the output terminal of the resonant converter through the short-circuit path formed by the switching circuit, the plurality of second bridge arm units is used as a full bridge circuit.

7. The resonant converter of claim 1, further comprising:
a processor coupled to the switching circuit, and configured to detect an electrode voltage of a load to generate a detection signal, wherein the processor is configured to control the switching circuit to change the plurality of connection positions of the plurality of second bridge arm units according to the detection signal.

8. A resonant conversion circuitry, comprising:
a first resonant converter comprising a first front-stage conversion circuit and a first resonant transformer circuit, wherein the first front-stage conversion circuit is configured to generate a first voltage according to a plurality of first front-stage control signals;
wherein the first resonant transformer circuit is coupled to the first front-stage conversion circuit, and is configured to convert the first voltage into a second voltage; and
a second resonant converter comprising a second front-stage conversion circuit and a second resonant transformer circuit, wherein the second front-stage conversion circuit is configured to generate a third voltage according to a plurality of second front-stage control signals;
wherein the second resonant transformer circuit is coupled to the second front-stage conversion circuit, and is configured to convert the third voltage into a fourth voltage, and the second resonant transformer circuit is further coupled to the first resonant transformer circuit; and
wherein the plurality of first front-stage control signals and the plurality of second front-stage control signals are interleaved with each other;
wherein the first resonant converter further comprises a first back-stage conversion circuit, the first back-stage conversion circuit is coupled to the first resonant transformer circuit;
wherein the first resonant transformer circuit comprises a plurality of first primary windings and a plurality of first secondary windings, and the second resonant transformer circuit comprises a plurality of second primary windings and a plurality of second secondary windings;
wherein a first portion of the plurality of first secondary windings are coupled to each other, a first portion of the plurality of second secondary windings are coupled to each other, and a second portion of the plurality of first secondary windings is coupled to a second portion of the plurality of second secondary windings.

9. The resonant conversion circuitry of claim 8, wherein the first back-stage conversion circuit is configured to convert the second voltage according to a plurality of first back-stage control signals;
wherein the second resonant converter further comprises a second back-stage conversion circuit, the second back-stage conversion circuit is coupled to the second resonant transformer circuit, and is configured to convert the fourth voltage according to a plurality of second back-stage control signals;
wherein the plurality of first back-stage control signal and the plurality of second back-stage control signal are interleaved with each other.

10. The resonant conversion circuitry of claim 8, wherein one of the plurality of first secondary windings further comprises a first sub-winding, a first terminal of the first sub-winding is coupled to the first back-stage conversion circuit, and a second terminal of the first sub-winding is coupled to one of the plurality of second secondary windings.

11. The resonant conversion circuitry of claim 10, wherein the plurality of first secondary windings further comprises a plurality of second sub-windings, a plurality of first terminals of the plurality of second sub-windings is coupled to each other, and a plurality of second terminals of the plurality of second sub-windings is coupled to another one of the plurality of second secondary windings.

12. The resonant conversion circuitry of claim 8, wherein a plurality of terminals of the plurality of first primary windings is coupled to each other.

13. A resonant conversion circuitry, comprising:
 a first resonant converter comprising:
  a first front-stage conversion circuit comprising a plurality of first front-stage bridge arm units, and configured to output a first voltage;
  a first resonant transformer circuit coupled to the plurality of first front-stage bridge arm units, and configured to convert the first voltage into a second voltage; and
  a first back-stage conversion circuit coupled to the first resonant transformer circuit, and comprising a plurality of first back-stage bridge arm units; and
 a second resonant converter comprising:
  a second front-stage conversion circuit comprising a plurality of second front-stage bridge arm units, and configured to output a third voltage;
  a second resonant transformer circuit coupled to the plurality of second front-stage bridge arm units, and configured to convert the third voltage into a fourth voltage; and
  a second back-stage conversion circuit coupled to the second resonant transformer circuit, and comprising a plurality of second back-stage bridge arm units; and
 a state selection circuit coupled to the first resonant converter and the second resonant converter, and configured to selectively connect the first resonant converter and the second resonant converter in series, or connect the first resonant converter and the second resonant converter in parallel;
 wherein the first back-stage conversion circuit further comprises a plurality of first multi-level switching elements, and the first resonant converter further comprises:
  a switching circuit coupled to the first back-stage conversion circuit, and configured to selectively change a plurality of connection positions of the plurality of first back-stage bridge arm units, so that the first back-stage conversion circuit converts the second voltage into a first direct current power by the plurality of first back-stage bridge arm units instead of by the plurality of first multi-level switching elements, or the first back-stage conversion circuit converts the second voltage into a second direct current power by the plurality of first back-stage bridge arm units and the plurality of first multi-level switching elements.

14. The resonant conversion circuitry of claim 13, wherein the resonant conversion circuitry comprises a positive output terminal and a negative output terminal, and the state selection circuit further comprises:
 a series switch, wherein the first back-stage conversion circuit is coupled to the positive output terminal and a first terminal of the series switch, and the second back-stage conversion circuit is coupled to the negative output terminal and a second terminal of the series switch.

15. The resonant conversion circuitry of claim 14, wherein the state selection circuit further comprises:
 a first parallel switch coupled between the first terminal of the series switch and the negative output terminal; and
 a second parallel switch coupled between the second terminal of the series switch and the positive output terminal.

16. The resonant conversion circuitry of claim 13, wherein the switching circuit comprises a plurality of first short-circuit switches and a second short-circuit switch, the plurality of first short-circuit switches is coupled to two terminals of the plurality of first back-stage bridge arm units, the second short-circuit switch is coupled between a plurality of bridge switches of at least one of the plurality of first back-stage bridge arm units.

17. The resonant conversion circuitry of claim 16, wherein when the first back-stage conversion circuit converts the second voltage into the first direct current power, the plurality of first back-stage bridge arm units is used as a full bridge circuit.

18. The resonant conversion circuitry of claim 17, wherein the first back-stage conversion circuit converts the second voltage into the second direct current power, the plurality of first back-stage bridge arm units and the plurality of first multi-level switching elements are used as a three-phase three-level circuit.

* * * * *